US008196198B1

(12) United States Patent
Eger (10) Patent No.: US 8,196,198 B1
(45) Date of Patent: Jun. 5, 2012

(54) ACCESS USING IMAGES

(75) Inventor: David Thomas Eger, Burlingame, CA (US)

(73) Assignee: Google Inc., Mountain View, CA (US)

( * ) Notice: Subject to any disclaimer, the term of this patent is extended or adjusted under 35 U.S.C. 154(b) by 727 days.

(21) Appl. No.: 12/345,265

(22) Filed: Dec. 29, 2008

(51) Int. Cl.
*G06F 7/04* (2006.01)
(52) U.S. Cl. .................. 726/21; 726/2; 726/7
(58) Field of Classification Search .......... 726/2, 4, 726/17, 21, 27; 713/155–159, 168–186; 380/247–250; 705/44
See application file for complete search history.

(56) References Cited

U.S. PATENT DOCUMENTS

| | | | |
|---|---|---|---|
| 6,128,397 A | 10/2000 | Baluja et al. | |
| 6,195,698 B1 | 2/2001 | Lillibridge et al. | |
| 6,295,387 B1 | 9/2001 | Burch | |
| 6,956,966 B2 | 10/2005 | Steinberg | |
| 7,149,899 B2 | 12/2006 | Pinkas | |
| 7,266,693 B1 | 9/2007 | Potter | |
| 7,653,944 B2 | 1/2010 | Chellapilla | |
| 7,656,402 B2 * | 2/2010 | Abraham et al. | 345/420 |
| 7,841,940 B2 * | 11/2010 | Bronstein | 463/29 |
| 7,891,005 B1 * | 2/2011 | Baluja et al. | 726/26 |
| 7,908,223 B2 * | 3/2011 | Klein et al. | 705/75 |
| 7,921,454 B2 | 4/2011 | Cerruti | |
| 7,929,805 B2 * | 4/2011 | Wang et al. | 382/298 |
| 8,019,127 B2 | 9/2011 | Misra | |
| 8,073,912 B2 | 12/2011 | Kaplan | |
| 8,090,219 B2 | 1/2012 | Gossweiler et al. | |
| 8,103,960 B2 * | 1/2012 | Hua et al. | 715/758 |
| 8,136,167 B1 | 3/2012 | Gossweiler et al. | |
| 2002/0141639 A1 | 10/2002 | Steinberg | |
| 2004/0073813 A1 * | 4/2004 | Pinkas et al. | 713/202 |
| 2004/0199597 A1 | 10/2004 | Libbey et al. | |
| 2005/0014118 A1 | 1/2005 | von Ahn Arellano | |
| 2005/0065802 A1 | 3/2005 | Rui et al. | |
| 2005/0229251 A1 | 10/2005 | Chellapilla et al. | |
| 2006/0167874 A1 | 7/2006 | von Ahn Arellano et al. | |
| 2007/0130618 A1 * | 6/2007 | Chen | 726/8 |
| 2007/0201745 A1 | 8/2007 | Wang et al. | |
| 2008/0050018 A1 | 2/2008 | Koziol | |
| 2008/0216163 A1 * | 9/2008 | Pratte et al. | 726/7 |
| 2008/0244700 A1 * | 10/2008 | Osborn et al. | 726/2 |
| 2009/0094687 A1 | 4/2009 | Jastrebski | |

(Continued)

FOREIGN PATENT DOCUMENTS

WO    2008/091675 A1    7/2008

OTHER PUBLICATIONS

Chellapilla, K., et al. "Computers Beat Humans at Single Character Recognition in Reading Based Human Interaction Proofs (HIPs)," in Proceedings of the 2nd Conference on Email and Anti-Spam, (CEAS) 2005.

(Continued)

*Primary Examiner* — Kambiz Zand
*Assistant Examiner* — Fahimeh Mohammadi
(74) *Attorney, Agent, or Firm* — Brake Hughes Bellermann LLP (57) ABSTRACT

A computer-implemented method may include presenting to a user multiple images, multiple identifiers and a challenge to select one of the identifiers for each of the images, receiving the selected identifiers from the user, and providing access to a computing service based on a comparison of the selected identifiers to an answer to the challenge.

27 Claims, 8 Drawing Sheets

U.S. PATENT DOCUMENTS

| | | | |
|---|---|---|---|
| 2009/0113294 | A1 | 4/2009 | Sanghavi et al. |
| 2009/0138468 | A1* | 5/2009 | Kurihara ........................... 707/5 |
| 2009/0138723 | A1 | 5/2009 | Nyang |
| 2009/0150983 | A1* | 6/2009 | Saxena et al. ...................... 726/7 |
| 2009/0235178 | A1* | 9/2009 | Cipriani et al. ............... 715/741 |
| 2009/0249476 | A1 | 10/2009 | Seacat et al. |
| 2009/0249477 | A1 | 10/2009 | Punera |
| 2009/0319274 | A1 | 12/2009 | Gross |
| 2009/0325696 | A1 | 12/2009 | Gross |
| 2009/0328150 | A1 | 12/2009 | Gross |
| 2010/0077210 | A1 | 3/2010 | Broder et al. |
| 2010/0100725 | A1 | 4/2010 | Ozzie et al. |

OTHER PUBLICATIONS

Rowley, H., et al. "Rotation Invariant Neural Network-Based Face Detection," CMU-CS-97-201, Dec. 1997.

Fu, H., et al. "Upright Orientation of Man-Made Objects," SIGGRAPH 2008, 35th International Conference and Exhibition on Computer Graphics and Interactive Techniques, Aug. 2008.

Lopresti, D., "Leveraging the CAPTCHA Problem," 2nd Int'l Workshop on Human Interactive Proofs, Bethlehem, PA, May 2005.

Rowley, H., et al. "Neural Network-Based Face Detection," IEEE Transactions on Pattern Analysis and Machine Intelligence, vol. 20, No. 1, Jan. 1998.

Mori, G., et al. "Recognizing Objects in Adversarial Clutter: Breaking a Visual CAPTCHA," Proceedings of Computer Vision and Pattern Recognition, 2003.

Rui, Y., et al. "Characters or Faces: A User Study on Ease of Use for HIPs," Lecture Notes in Computer Science, vol. 3517, pp. 53-65, Springer Berlin, 2005.

Vailaya, A., et al. "Automatic Image Orientation Detection," IEEE Transactions on Image Processing, vol. 11, No. 7, pp. 746-755, Jul. 2002.

Baluja, S., et al. "Large Scale Performance Measurement of Content-Based Automated Image-Orientation Detection," IEEE Conference on Image Processing, vol. 2, pp. 514-517, Sep. 11-14, 2005.

Viola, P., et al. "Rapid Object Detection Using a Boosted Cascade of Simple Features," Proceedings of Computer Vision and Pattern Recognition, pp. 511-518, 2001.

Von Ahn, L., et al. "Telling Humans and Computers Apart (Automatically) or How Lazy Cryptographers do AI," Communications on the ACM, vol. 47, No. 2, Feb. 2004.

Von Ahn, L., et al. "CAPTCHA: Using Hard AI Problems for Security," Advances in Cryptology—EUROCRYPT 2003, Springer Berlin, 2003.

Von Ahn, L., et al. "Labeling Images With a Computer Game," Proceedings of the SIGCHI Conference on Human Factors in Computing Systems, ACM, pp. 319-326, Vienna, Austria, 2004.

Von Ahn, L., et al. "Improving Accessibility of the Web With a Computer Game," Proceedings of the SIGCHI Conference on Human Factors in Computing Systems, ACM, pp. 79-82, Montreal, Quebec, Canada, 2006.

Von Ahn, L. "Games With a Purpose," IEEE Computer, pp. 96-98, Jun. 2006.

Wu, V., et al. "Textfinder: An Automatic System to Detect and Recognize Text in Images," Computer Science Department, Univ. of Massachusetts, Nov. 18, 1997.

Wu, V., et al. "Finding Text in Images," Proceedings of the 2nd ACM Int'l Conf. on Digital Libraries, 1997.

Zhang, L., et al. "Boosting Image Orientation Detection With Indoor vs. Outdoor Classification," IEEE Workshop on Application of Computer Vision, pp. 95-99, Dec. 2002.

Elson, J., et al. "Asirra: A CAPTCHA that Exploits Interest-Aligned Manual Image Categorization," CCS '07, 9 pages, Oct. 2007.

Praun, E., et al. "Lapped Textures," ACM SIGGRAPH 2000, 6 pages, 2000.

Adamchak, et al, "A Guide to Monitoring and Evaluating Adolescent Reproductive Health Programs", Pathfinder International, Focus on Young Adults, 2000, pp. 265-274.

Siegle, D., "Sample Size Calculator", Neag School of Education—University of Connecticut, retrieved on Sep. 18, 2008, from http://www.gifted.uconn.edu/siegle/research/Samples/samplecalculator.htm, 2 pages.

"Sampling Information", Minnesota Center for Survey Research—University of Minnesota, 2007, 4 pages.

U.S. Appl. No. 12/256,827, filed Oct. 23, 2008.

U.S. Appl. No. 12/254,312, filed Oct. 20, 2008.

U.S. Appl. No. 12/486,714, filed Jun. 17, 2009.

U.S. Appl. No. 12/345,265, filed Dec. 29, 2008.

U.S. Appl. No. 12/254,325, filed Oct. 20, 2008.

Chew, et al., "Collaborative Filtering CAPTCHA's", HIP 2005, LNCS 3517, May 20, 2005, pp. 66-81.

Extended EP Search Report for EP Application No. 08713263.5, mailed Feb. 4, 2011, 9 pages.

Lopresti, "Leveraging the CAPTCHA Problem", HIP 2005, LNCS 3517, May 20, 2005, pp. 97-110.

Shirali-Shahrea, "Collage CAPTCHA", IEEE 2007, 4 pages.

Shirali-Shahrea, "Online Collage CAPTCHA", WIAMIS '07: Eight International Workshop on Image Analysis for Multimedia Interactive Services, 2007, 4 pages.

Xu, et al., "Mandatory Human participation: a new authentication scheme for building secure systems", Proceedings of the 12th International Conference on Computer Communications and Networks, Oct. 20, 2003, pp. 547-552.

"Figure", The American Heritage Dictionary of the English Language, 2007, retrieved on Aug. 13, 2011 from http://www.credoreference.com/entry/hmdictenglang/figure, 4 pages.

First Office Action for Chinese Patent Application No. 200880002917.8 (with English Translation), mailed May 12, 2011, 7 pages.

Non-Final Office Action for U.S. Appl. No. 12/606,465, mailed Aug. 19, 2011, 25 pages.

Non-Final Office Action for U.S. Appl. No. 12/254,325, mailed Sep. 1, 2011, 17 pages.

Restriction Requirement for U.S. Appl. No. 12/254,312, mailed Sep. 14, 2011, 5 pages.

Restriction Requirement Response for U.S. Appl. No. 12/254,312, filed Oct. 14, 2011, 1 page.

Notice of Allowance for U.S. Appl. No. 12/254,312, mailed Nov. 7, 2011, 19 pages.

Office Action for European Application No. 08713263.5, mailed Dec. 23, 2011, 4 pages.

Final Office Action for U.S. Appl. No. 12/254,325, mailed Feb. 10, 2012, 15 pages.

Non-Final Office Action for U.S. Appl. No. 12/486,714, mailed Mar. 2, 2012, 16 pages.

* cited by examiner

ACCESS USING IMAGES

TECHNICAL FIELD

This document relates to systems and techniques for providing access to computing resources based on user responses to images.

BACKGROUND

Computer security is becoming an ever more important feature of computing systems. As users take their computers with them in the form of laptops, palmtops, and smart phones, it becomes desirable to lock such mobile computers from access by third parties. Also, as more computing resources on servers are made available over the Internet, and thus theoretically available to anyone, it becomes more important to ensure that only legitimate users, and not hackers or other fraudsters, are using the resources.

Computer security is commonly provided by requiring a user to submit credentials in the form of a password or pass code. For example, a mobile device may lock after a set number of minutes of inactivity, and may require a user to type a password that is known only to them in order to gain access to the services on the device (or may provide access to limited services without a password). In a similar manner, a web site may require a user to enter a password before being granted access. Also, certain web sites may require potential users to enter a term that is displayed to the users in an obscured manner so that automated machines cannot access the web sites for proper or improper purposes (e.g., to overload the web site servers). Such techniques may be commonly referenced as CAPTCHA's (Completely Automated Public Turing test to tell Computers and Humans Apart).

SUMMARY

This document describes systems and techniques that may be used to limit access to computing services, which, throughout this document, includes computing devices, electronic devices (e.g., music devices, game devices, etc.) and computing services (e.g., online computing services, web pages, etc.). In general, multiple images are shown to a user along with multiple identifiers, and a challenge may require the user to select the appropriate identifier for each of the images to gain access. For example, the images may be objects and the identifiers may be names of objects. More identifiers than images may be shown to the user such that the user has more identifiers to select from to associate with each of the images. If the user selects the appropriate identifier for each of the images, then access is granted. Such an example could be used in a CAPTCHA system to block access by automated computing systems, but permit access by human users.

In one exemplary implementation, the images may be three dimensional models. Also, the three dimensional (3D) models may be generated on the fly as requests for access are received. Many different variations of the same images may be presented to the user. For example, if the images presented are 3D models, the 3D models may be colored, textured, rotated and/or set against various backgrounds to achieve many different variations of the same 3D models. In this manner, a small corpus of labeled 3D models may be used. Although a small corpus of labeled 3D models may be used, the number of potential variations is great and does not have to rely on an enormous corpus of labeled data to provide the necessary variation against attackers, who might attempt to label a corpus of stock photos or images.

Multiple images also may be displayed to increase the level of security (because it is much harder to label three or four or six images by guessing than it is to label one). Also, the images may be pre-screened so that only images that are very difficult for a computing system to automatically label with an identifier are selected.

In certain implementations, such systems and techniques may provide one or more advantages. For example, using multiple images such as 3D models that can be colored, textured, rotated and/or set against various backgrounds along with more identifiers to select from than images can provide for a number of different inputs so as to provide relatively high security. The systems and techniques may be presented to a user on devices that use a touch screen such that the user can make identifier selections without using a keyboard or mouse. It also permits the user to enter a pass code with the use of a keyboard. Such an approach may be particularly useful for touch screen devices such as mobile smart phones, where a keyboard is hidden during normal use of the device. Also, image-based access may provide a more pleasing interface for users of computing devices, so that the users are more likely to use or remember a device or service.

According to one general aspect, a computer-implemented method may include presenting to a user multiple images, multiple identifiers and a challenge to select one of the identifiers for each of the images, receiving the selected identifiers from the user and providing access to a computing service based on a comparison of the selected identifiers to an answer to the challenge.

Implementations may include one or more of the following features. For example, the images may be three dimensional models. The images may be randomly textured, three dimensional models. The images may be three dimensional models with each of the three dimensional models set against a separate, randomly generated background. The images may be randomly rotated, three dimensional models. The images may be randomly colored, three dimensional models. The images may be randomly textured, three dimensional models with each of the three dimensional models set against a separate, randomly generated background.

In one exemplary implementation, at least two times more of the identifiers are presented than the images. In another exemplary implementation, at least three times more of the identifiers are presented than the images.

Providing access to the computing service may include unlocking a mobile computing device and/or may include serving to the user a web page.

In another general aspect, a recordable storage medium may include recorded and stored instructions that, when executed, perform the actions of presenting to a user multiple images, multiple identifiers and a challenge to select one of the identifiers for each of the images, receiving the selected identifiers from the user and providing access to a computing service based on a comparison of the selected identifiers to an answer to the challenge.

Implementations may include one or more of the following features. For example, the images may be three dimensional models. The images may be randomly textured, three dimensional models. The images may be three dimensional models with each of the three dimensional models set against a separate, randomly generated background. The images may be randomly rotated, three dimensional models. The images may be randomly colored, three dimensional models. The images may be randomly textured, three dimensional models with each of the three dimensional models set against a separate, randomly generated background. Providing access to the computing service may include unlocking a mobile computing device and/or serving to the user a web page.

In another general aspect, a computer-implemented access control system may include one or more servers that are arranged and configured to present to a user multiple images, multiple identifiers and a challenge to select one of the identifiers for each of the images, receive the selected identifiers from the user and provide access to a computing service based on a comparison of the selected identifiers to an answer to the challenge.

Implementations may include one or more of the following features. For example, the images may be randomly textured, three dimensional models with each of the three dimensional models set against a separate, randomly generated background. The servers may be arranged and configured to provide access to the computing service including serving to the user a web page.

In another general aspect, a computer-implemented method may include presenting to a user multiple images, multiple identifiers and a challenge to select one of the identifiers for each of the images, receiving the selected identifiers from the user and providing access to an electronic device based on a comparison of the selected identifiers to an answer to the challenge.

Implementations may include one or more of the following features. For example, the images may be randomly textured, three dimensional models with each of the three dimensional models set against a separate, randomly generated background. Providing access to the electronic device may include unlocking a music device and/or unlocking a game device.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

This document describes systems and techniques for mediating access to computing services, which throughout this document includes mediating access to computing devices, electronic devices (e.g., music devices, game devices, etc.) and mediating access to computing services (e.g., online computing services including websites and web pages). Such techniques may include displaying one or more images and multiple identifiers. The user may then be challenged and/or prompted to select one of the presented identifiers for each of the images. If the user properly selects the correct identifier for each of the images, the user may be provided access to a device or service.

FIGS. 1A-1D show an example screen shot 100, which may be presented to a user. The screen shot 100 may be presented in response to the user seeking access to a device or to a service. For example, the user may navigate to a website using a browser, where the screen shot 100 is presented to the user before the user can enter the website. The screen shot 100 also may be presented to a user seeking to unlock a device such as after a period of inactivity or after the device goes from a sleep mode to an active mode.

The screen shot 100 includes a challenge to the user that the user is required to answer correctly in order to gain access. In the figures, screen shot 100 includes multiple images 102*a*-102*c*, multiple identifiers 104 and a submit button 106. The images 102*a*-102*c* may be randomly generated and presented to the user in the screen shot 100. To gain access, the user is challenged to select the appropriate identifier from the list of identifiers 104 for each of the images 102*a*-102*c* and to submit the selections using the submit button 106. For example, instructions may be provided to the user telling the user that access may be granted by correctly labelling each of the images 102*a*-102*c* with one of the provided identifiers 104. If the user selects the correct identifier for each of the images 102*a*-102*c*, then access is granted. If the user does not select the correct identifier for each of the images 102*a*-102*c*, then access is denied.

Figure 1A:
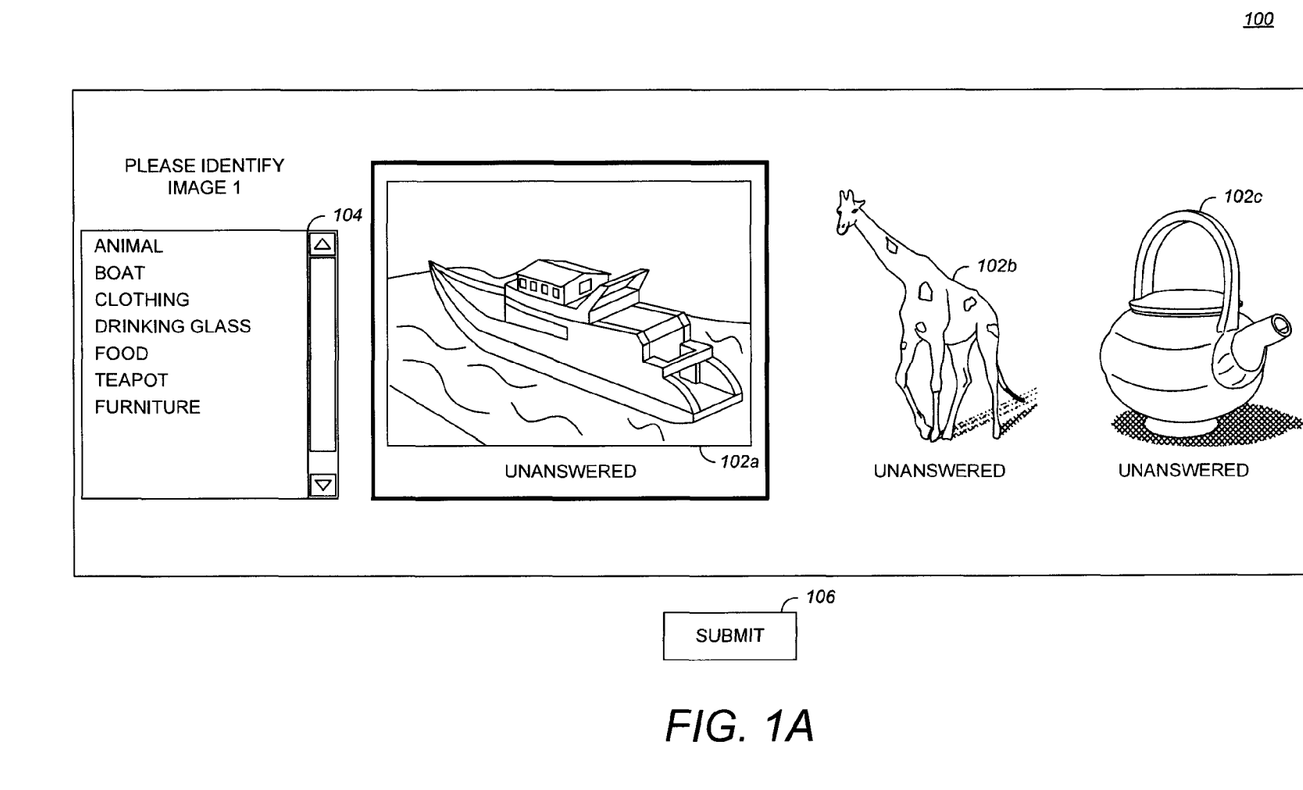
FIGS. 1A-1D show example screen shots of a challenge presented to a user to gain access.

In FIG. 1A, the screen shot 100 is provided to the user including a challenge to label each of the images 102*a*-102*c* with the correct identifier from the provided identifiers 104. Each of the images 102*a*-102*c* is displayed as being "unanswered" meaning that an identifier has not been selected for any of the images 102*a*-102*c*. The user may select an identifier for an image in different ways. For instance, the user may select one of the images such as image 102*a* and then select an identifier from the provided list of identifiers 104. The selected identifier may be displayed with the image in place of "unanswered." The user may change a selected identifier for an image simply by selecting another identifier while the image is highlighted. As the user selects an image, the instructions provided to the user may change. In FIG. 1A, if the user selects image 102*a*, the instructions in the screen shot 100 state "Please identify image 1." As, the user selects the other images 102*b* and 102*c*, the instructions may change accordingly.

Figure 1B:
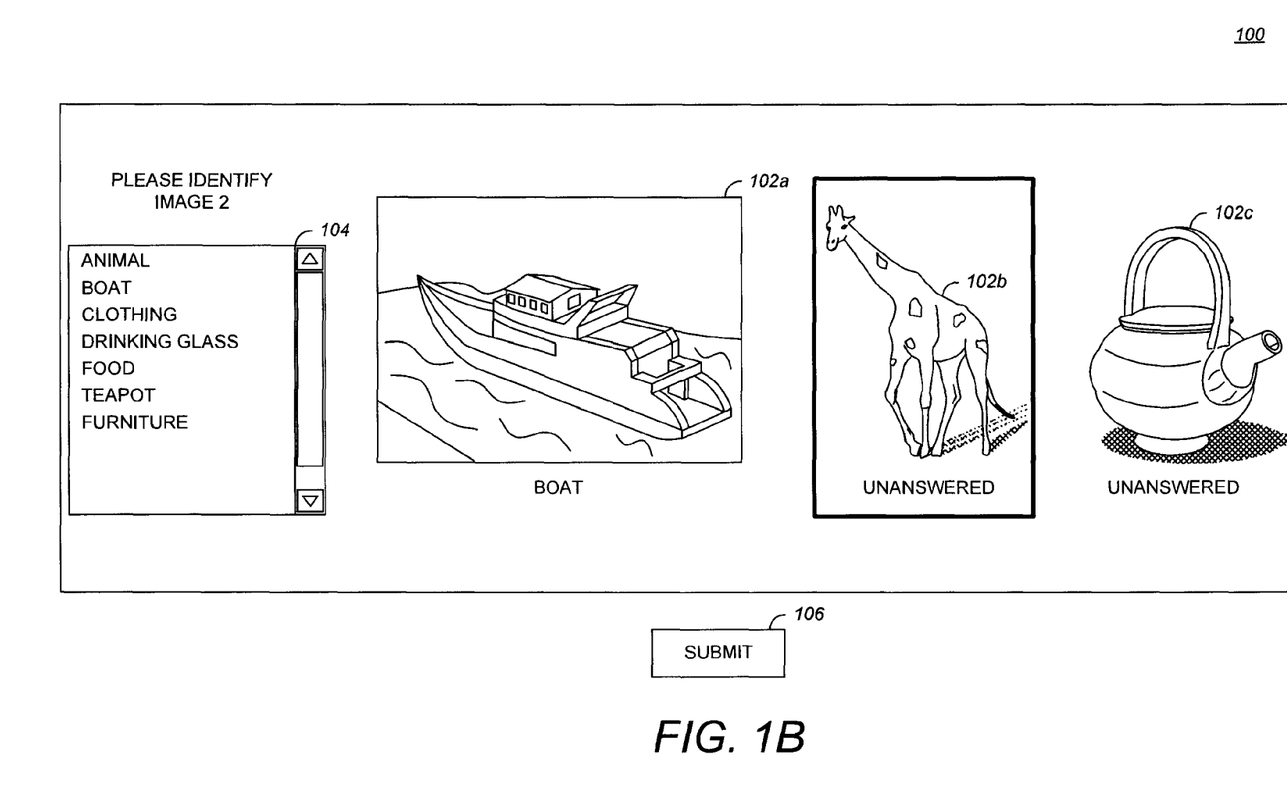

FIG. 1B illustrates the screen shot 100 where the user has selected image 102*a* and selected the identifier "Boat" from the list of identifiers 104 for the image 102*a*. The identifier is now displayed below the image 102*a*. The images 102*a*-102*c* and the identifiers 104 may be selected using a touch screen, a mouse, a keyboard and/or other types of methods to select objects displayed on a screen. Although the identifiers 104 are illustrated as a list next to the images 102*a*-102*c*, this illustrates merely one exemplary implementation. Other implementations may be used to present the identifiers 104 to the user. For instance, the identifiers 104 may be presented to the user in a drop down menu. Also, the identifiers may be presented below each of the images 102*a*-102*c* in a drop down menu or other presentation mechanism including, for example, in a pop-up window.

Figure 1C:
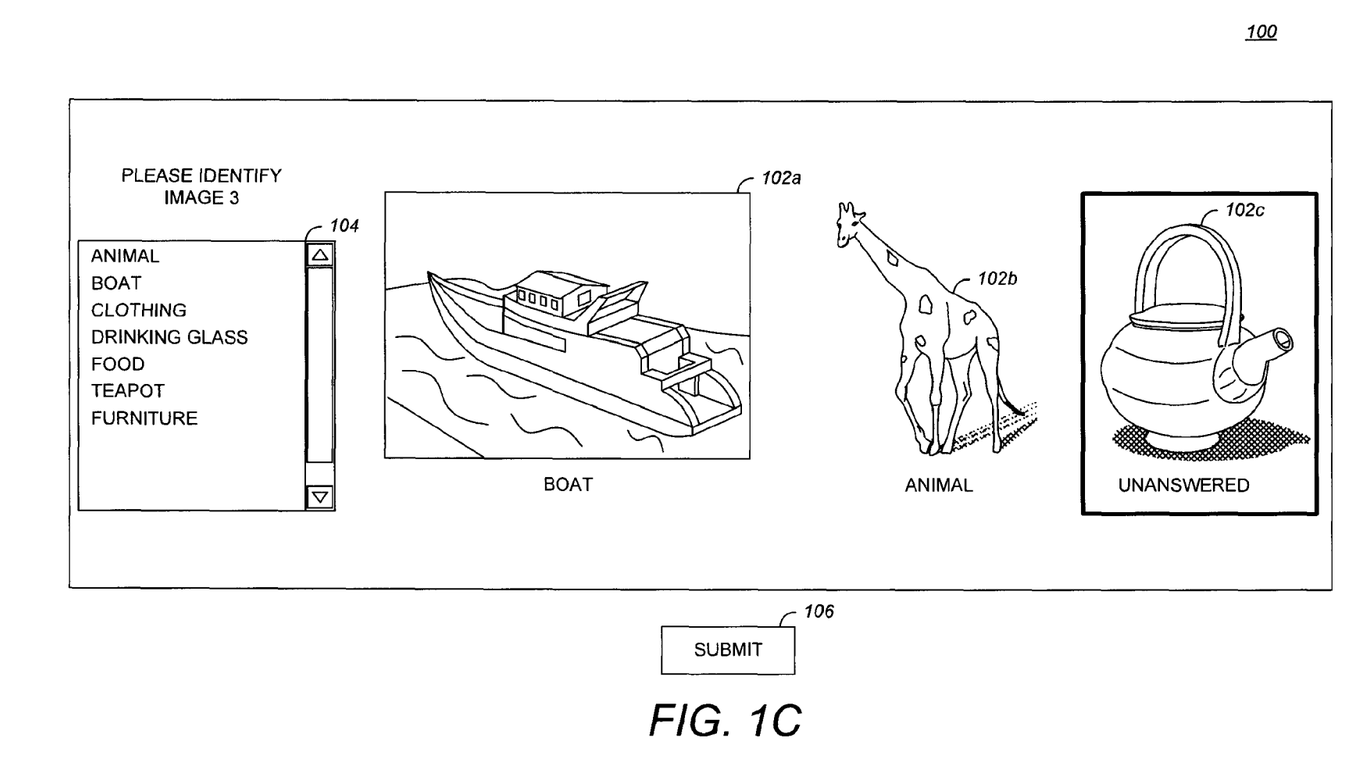

In FIG. 1B, the remaining two images 102*b* and 102*c* are "unanswered." When the user highlights or otherwise selects image 102*b*, the instructions in the screen shot 100 may change to state "Please identify image 2." FIG. 1C illustrates the screen shot 100 where the user has selected the image 102*b* and selected the identifier "Animal" from the list of identifiers 104 for the image 102*b*. The identifier is now displayed below the image 102*b*. Although, the selected identifier is displayed below the image in this example, the selected identifier for an image may be indicated in other exemplary manners. The remaining image 102c is "unanswered." When the user highlights or otherwise selects image 102c, the instruction in the screen shot may change to state "Please identify image 3." The instructions as presented to the user in this example are merely exemplary and other forms or manners of presenting instructions to the user may be implemented.

Figure 1D:
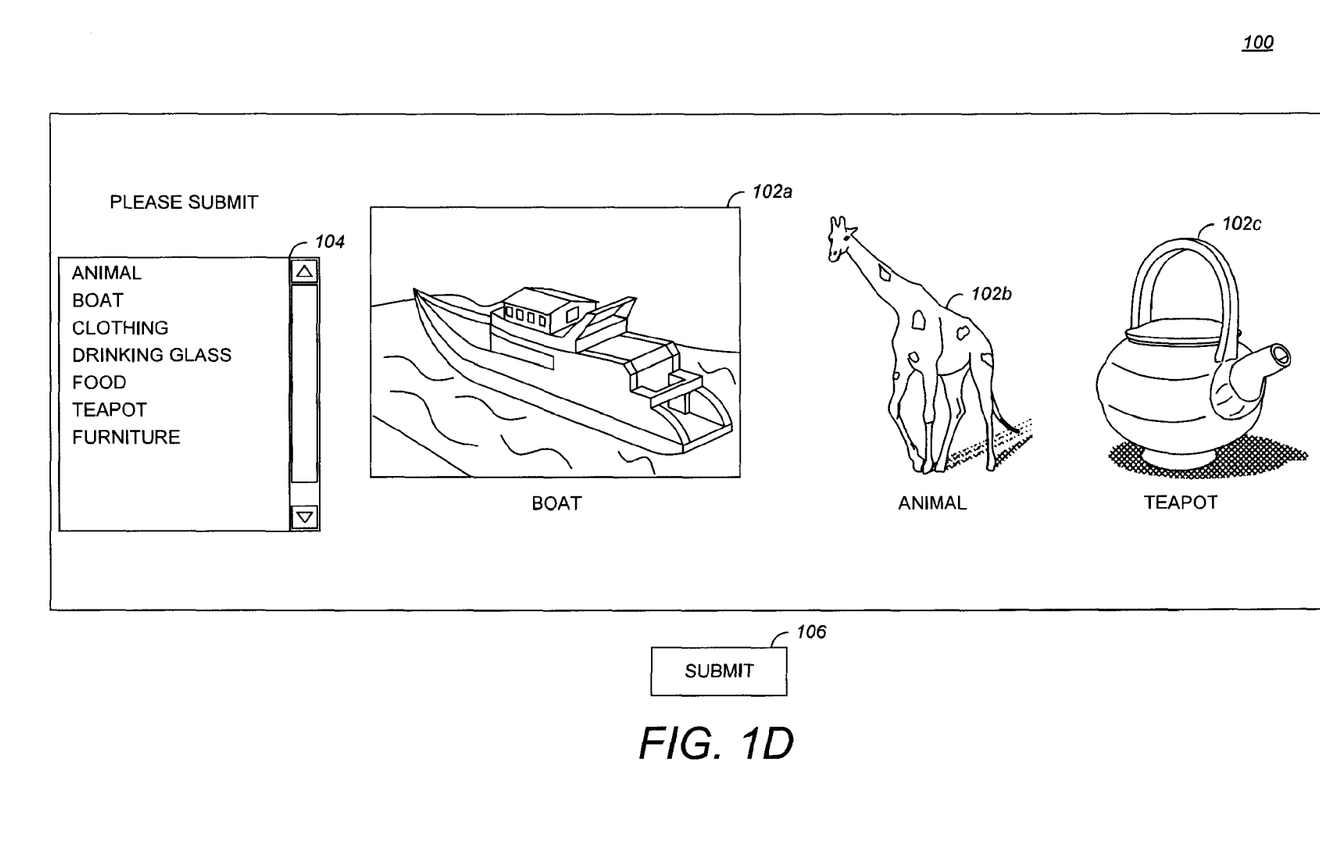

FIG. 1D illustrates the screen shot 100 where the user has selected the image 102c and selected the identifier "Teapot" from the list of identifiers 104 for the image 102c. The selected identifier is now displayed below the image 102c. When the user has selected an identifier for each of the images 102a-102c, the instructions may tell the user to "Please submit" in order to have the selected identifiers submitted for a comparison against the correct identifiers.

In one exemplary implementation, the submit button 106 may be grayed-out or not selectable until the user has selected an identifier for each of the images 102a-102c. In other exemplary implementations, the submit button 106 may be selectable at any time. The selection of the submit button 106 by the user may cause the selected identifiers to be submitted for a comparison against the correct identifiers. For example, if the screen shot 100 is presented to a user attempting to unlock a device, then selection of the submit button 106 may cause the selected identifiers to be compared against the correct identifiers for this particular challenge, where the comparison of the selected identifiers against the correct identifiers may be performed by a module in the device. If the comparison is a match, then the device is unlocked. If the comparison is not a match, the device is not unlocked. The user may be given one or more additional chances to unlock the device either with the same challenge or with a different randomly generated challenge. After a configurable number of unsuccessful attempts, the device may be locked on a more permanent basis. The use of such a system may be used to enable humans to access the device, but to prevent automated computer systems from accessing the device, especially devices that are capable of communicating with wired and/or wireless networks. The use of such a system also may be used to prevent accidental activation or use of the device when such use of the device is not intended by the user, such as when the device is in the user's pocket or other device holder.

Similarly, if the screen shot 100 is presented to a user attempting to access an online service such as, for example, attempting to access a website, then selection of the submit button 106 may cause the selected identifiers to be communicated to an access server. The comparison of the selected identifiers to the correct identifiers may be performed by the access server. If the comparison is a match, then access is granted to the website. If the comparison is not a match, then access is denied. The use of such a system may be used to enable humans to access the website, but to prevent automated computer systems from accessing the website because the automated systems may not be able to recognize the images and to select to correct identifier for each of the images.

In these example figures, the user is presented with more identifiers to select from than there are images presented. In one exemplary implementation, the user may be presented with at least twice as many identifiers to select from than there are images presented. In another exemplary implementation, the user may be presented with at least as many three times as many identifiers to select from than there are images presented. The more identifiers that are presented in relation to the number of images, the lower the probability that a human or an automated computing system would randomly guess the correct identifier for each of the images.

In one exemplary implementation, the images presented to the user may be computer-generated three dimensional (3D) models. For example, the images 102a-102c may be computer-generated 3D models of different objects, namely, a boat, an animal and a teapot. The use of 3D models may make it more difficult for automated computing systems to determine the identity of the image. Additionally, the same 3D models may be presented to the user with many different variations to the 3D model. For instance, the 3D model may be stylistically rendered and presented to include different colors, textures, and/or shading styles. The 3D models also may be randomly rotated such that they can be presented in various different orientations. The 3D models also may be presented against various different backgrounds. For example, each of the images 102a-102c may be presented against a different background.

The different variations may be applied to a 3D model individually or collectively in different combinations. For instance, the image 102b of the giraffe may be rotated and the giraffe object may be textured in something other than giraffe spots such as, for example, fur or bumps or any of many other types of textures. When these techniques are used to unlock a device, the device may randomly generate the 3D models with the different potential variations for presentation to the user. When these techniques are used to access a computing service, a server or other computing device that is remote from the user may randomly generate the 3D models with the different potential variations for presentation to the user.

In the above example, having the user select the correct identifier for each of the images to unlock the device may prevent the user from accidentally hitting buttons (e.g., when the device is in the user's pocket). Also, this makes it more difficult for remote hackers, especially automated machines, to access the device using guesses and other brute force-type techniques.

In one exemplary implementation, the images 102a-102c may be presented as a single composite image with the images 102a-102c being objects within the single composite image instead of the images 102a-102c being presented as multiple independent images. For example, the images 102a-102c may be presented left-to-right as objects within the single composite image. In another example, the images 102a-102c may be presented top-to-bottom as objects within the single composite image. The user may be challenged to select the proper identifier from the provided identifiers for each of the objects within the single composite image in the different manners described above.

The above techniques also may be used in combination with other security techniques such as, for example, passwords and/or biometrics to provide additional security to gain access.

Figure 2:
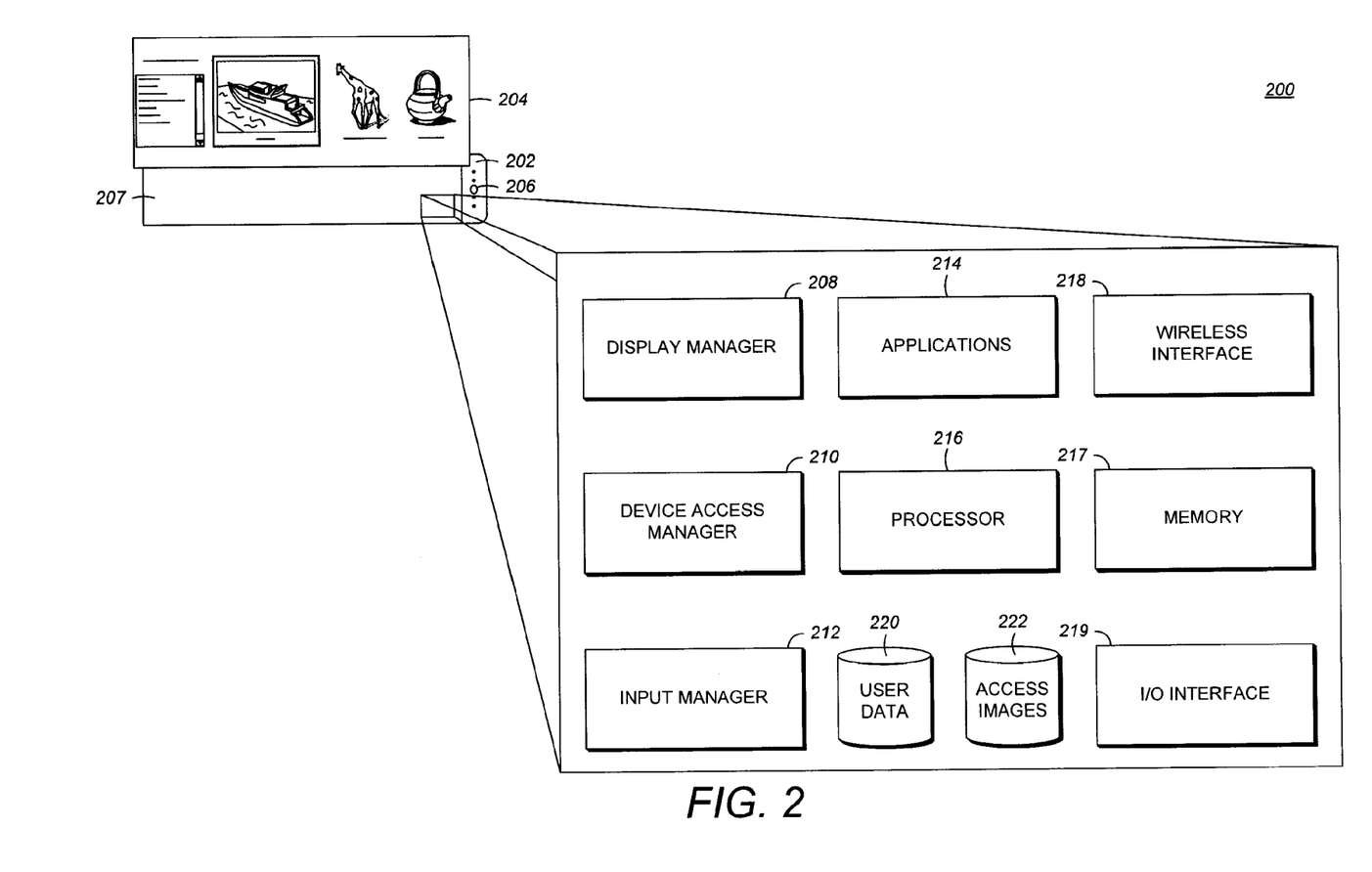
FIG. 2 is an exemplary block diagram of an illustrative mobile system for limiting access using images and identifier inputs from users.

FIG. 2 is an exemplary block diagram of an illustrative mobile system 200 for limiting device access using images and identifier inputs from users. The system includes, in the main, a mobile computing device 202, such as, for example, a smart phone or personal digital assistant (PDA), to which access can be granted, or that may mediate access to assets from remote servers or other computers, such as access to Internet web sites access to features and services on Internet web sites.

The device 202 can interact graphically using a graphical user interface (GUI) on a display 204 that may show representations of various images to a user and that may receive input from the user. In one example, the display 204 is a touch screen display, so that a user may directly press upon images to manipulate them on the display 204 and to select the correct identifier for each of the images from the provided identifiers. Input to the device may also be provided using a trackball 206 and a keyboard 207 on the device 202. The keyboard 207 may be a hard keyboard with physical keys, a soft keyboard that is essentially a touch screen keyboard, or a combination of both.

A display manager 208 is provided to supervise and coordinate information to be shown on the display 204. The display manager 208, for example, may be provided with data relating to information to be displayed and may coordinate data received from various different applications or modules. As one example, display manager 208 may receive data for overlapping windows on a windowed display and may determine which window is to be on top and where the lower window or windows is to be cut.

Device inputs such as presses on the touch screen 204 may be processed by an input manager 212. For example, the input manager 212 may receive information regarding input provided by a user on touch screen 204, and may forward such information to various applications or modules. For example, the input manager 212 may cooperate with the display manager 208 so as to understand what onscreen elements a user is selecting when they press on the touch screen 204.

The device 202 may include a processor 216 that executes instructions stored in memory 217, including instructions provided by a variety of applications 214 stored on the device 202. The processor 216 may comprise multiple processors responsible for coordinating interactions among other device components and communications over an I/O interface 219. The processor 216 also may be responsible for managing internal alerts generated by the device 202. For example, the processor 216 may be alerted by the input manager 212 (which may operate on the processor) when a user touches the display 204 so as to take the device 202 out of a sleep mode state. Such an input may cause the processor 216 to present images and identifiers to the user for the user to select and submit the correct identifier for each of the images in order to provide access to the device 202 or various services, as explained above and below. In one exemplary implementation, the input may cause the processor 216 to generate the images as 3D models for presentation to the user along with multiple identifiers. Also, the processor 216 may generate the variations such as, for example, color, shading, textures, different backgrounds and/or rotations, and randomly apply the variations to the 3D models or non-3D images for presentation to the user on the display 204.

The processor 216 may perform such functions in cooperation with a device access manager 210. The device access manager 210 may execute code to gather images from the access images memory 222, to gather the identifiers, and to present the images and identifiers to a user of the device 202. The device access manager 210 may display the images in a manner that permits user manipulation of the images and the identifiers, may test user selected identifiers, and may provide an indication that access should be granted or denied. The device access manager 210 also may execute code to apply randomly the different variations to the images such as, for example, color, shading, textures, backgrounds and/or rotations for presentation to the user on the display 204. In one exemplary implementation, the device access manager 210 may execute code to use a lapped textures technique to select a texture sample and apply it to a 3D model such that the 3D model is textured and the textured 3D model is presented to the user.

The device also includes memory 220, 222 storing various data. The memory 220, 222 may comprise random access memory where computer instructions and data are stored in a volatile memory device for execution by the processor 216. The memory 220, 222 may also include read-only memory where invariant low-level systems code or data for basic system functions such as basic input and output, and startup instructions reside. In addition, the memory 220, 222 may include other suitable types of memory such as programmable read-only memory, erasable programmable read-only memory, electrically erasable programmable read-only memory, hard disks, and removable memory such as microSD cards or Flash memory.

The memory 220, 222 may, in one example, include user data memory 220, which may story various parameters describing preferences for a user of the device 202. The user data memory 220 may, for example, store and provide ordinary user pass codes, user identifying information (e.g., name, address, telephone numbers, and e-mail addresses), and other such information. Separately or together, access images memory 222 may store images and identifiers used to access the device 202 or various web pages. The access images memory also may store information needed to generate the different variations to be applied to the images, such as the 3D models. In one exemplary implementation, the access images memory 222 may store multiple individual images from which the device access manager 210 may select for presentation on the display 204. In another exemplary implementation, the access images memory 222 may store multiple single composite images from which the device access manager 210 may select for presentation on the display 204. The single composite images may include multiple images that are objects within the single composite image, where the objects may be arranged in various different manners (e.g., right-to-left, top-to-bottom, etc.).

The device 202 may communicate with other devices or a network through a wireless interface 218. The wireless interface 218 may provide for communication by the device 202 with messaging services such as text messaging, e-mail, and telephone voice mail messaging. In addition, the wireless interface 218 may support downloads and uploads of content and computer code over a wireless network. The wireless interface 218 may additionally provide for voice communications in a wireless network in a familiar manner. As one example, the wireless interface 218 may be used to interact with internet web pages that are to be displayed on display 204, and to submit orientation information to a server or servers remote from the device 202.

Figure 3:
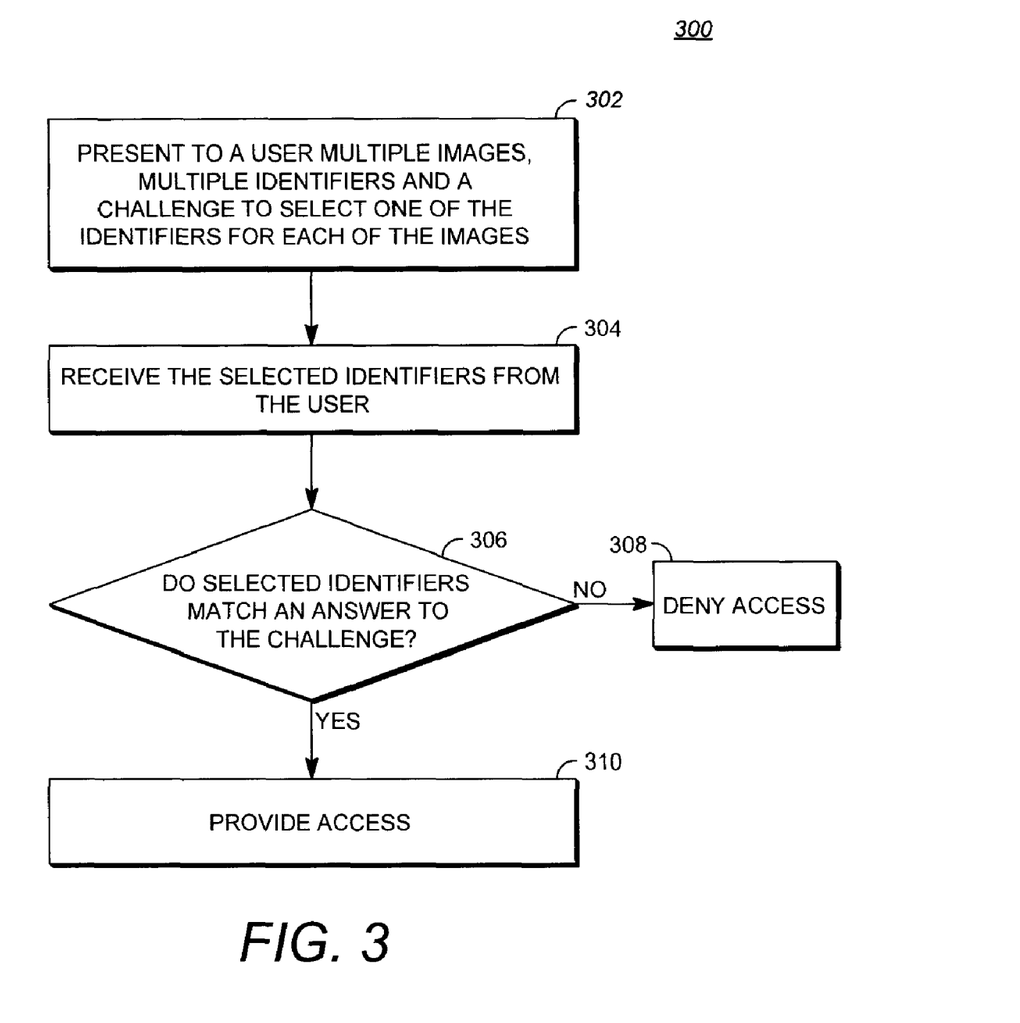
FIG. 3 is a flowchart of an example process for limiting access to a device or service.

FIG. 3 is a flowchart of an example process 300 for limiting access to a device or a computing service. In general, the process 300 involves presenting images and identifiers to user and determining whether the user can select the correct identifier for each of the images from the provided identifiers, and to thus conclude that the user is a human who should be granted access to the device or service.

Process 300 may include presenting to a user multiple images, multiple identifiers and a challenge to select one of the identifiers for each of the images (302). For example, as discussed above in FIGS. 1A-1D, images 102a-102c and identifiers 104 may be presented to the user. The challenge may be implicit in that the images are initially presented as being "unanswered" as illustrated in FIG. 1A. The challenge also may be explicit in that, for example, instructions are presented to the user to identify each of the images and to submit the identifiers. For example, FIGS. 1A-1D illustrate exemplary instructions that may be provided to the user in the screen shot 100.

As discussed above, the images presented to the user may include 3D models that may be generated in response to a request for access. In one exemplary implementation, to provide access to a computing service, a server on a network may generate the 3D models for presentation to the user. In another exemplary implementation, to provide access to a device or to a service, a module on the device (e.g., device access manager 210 of FIG. 2) may generate the 3D models for presentation to the user.

The images presented to the user may include many variations on the same images. For example, if the images are 3D models, the same 3D models may be randomly colored, shaded, textured, rotated and/or set against different random backgrounds so as to make it more difficult for a non-human to determine the proper identifier for the image. Also, by using different variations of the same 3D model, a smaller corpus of 3D models may be used and yet still achieve many, many different variations.

Process 300 also includes receiving the selected identifiers from the user (304). For example, the selected identifiers may be communicated to a module within a device or the selected identifiers may be communicated to a server on a network. The selected identifiers are received and a comparison is made to determine if the selected identifiers match an answer to the challenge (306). The answer to the challenge may be the correct identifiers for each of the presented images. If the selected identifiers do not match the answer, then access is denied (308). If the selected identifiers match the answer, then access is provided (310).

Figure 4:
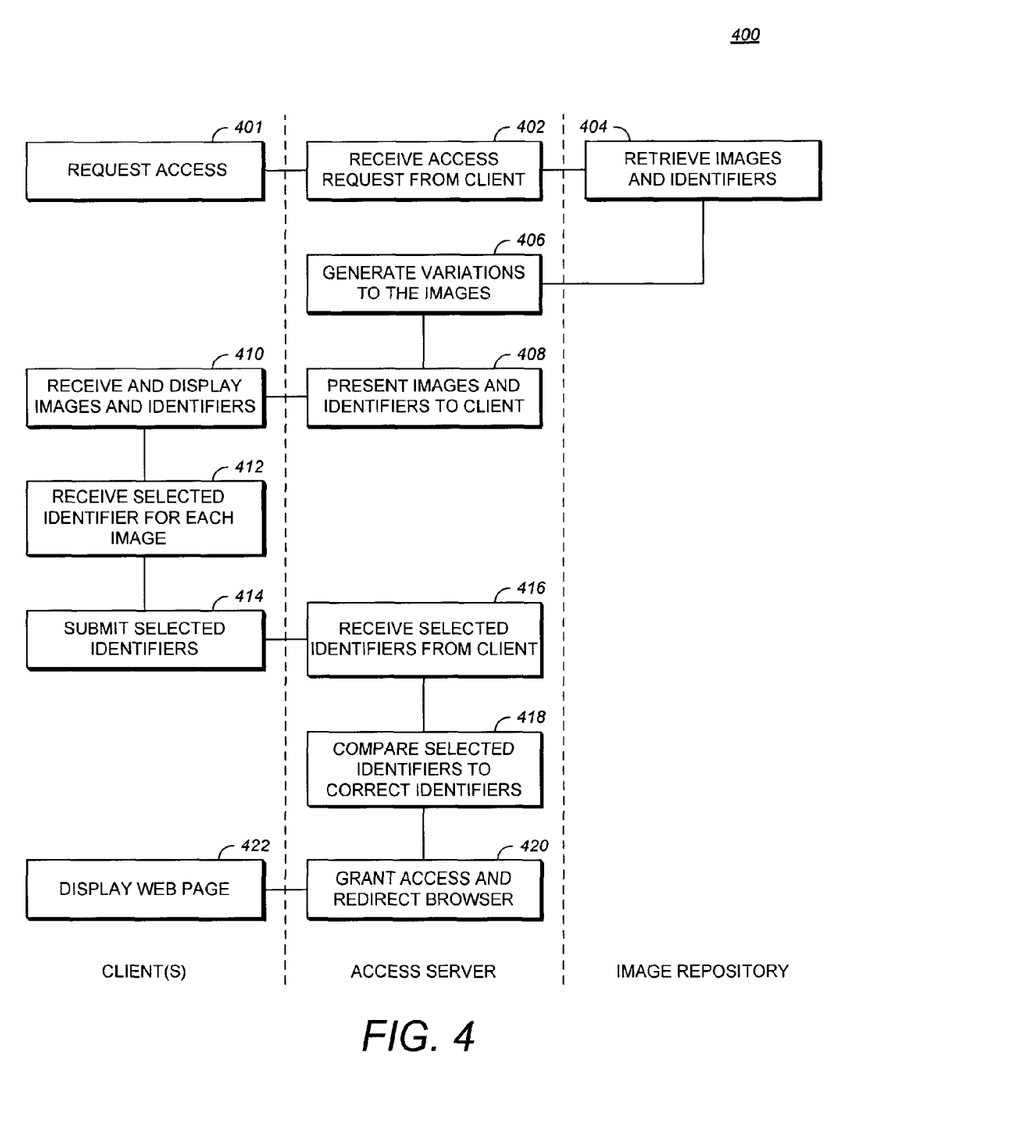
FIG. 4 is a swim lane diagram of an example process for granting user access to an online service.

FIG. 4 is a swim lane diagram of an example process 400 for granting user access to a web page and/or to an online service. A client may request access to a web page and/or to an online service (401). A request for access by a client may be received at an access server (402). The access server may request and retrieve multiple images and identifiers from an image repository (404). For example, the images (e.g., 3D models) may be stored on a storage medium as part of an image repository. The images may be stored along with metadata, which may further describe or include additional information regarding the image. The respective identifiers may be stored along with the images and/or the identifiers may be a part of the metadata about each image.

In one exemplary implementation, the image repository may store multiple individual images from which access server may select for presentation to the client. In another exemplary implementation, the image repository may store multiple single composite images from which the access server may select for presentation to the client. The single composite images may include multiple images that are objects within the single composite image, where the objects may be arranged in various different manners (e.g., right-to-left, top-to-bottom, etc.).

The access server may be configured to generate and to apply one or more variations to the retrieved images (406). For example, if the images are 3D models, the access server may randomly apply a color to one or more of the images. Also, the access server may randomly apply a texture to one or more of the images. In one exemplary implementation, the access server may use a lapped texture technique to apply a texture to the 3D model. Also, the access server may set the images against different backgrounds, shade the images and/or rotate the images in different orientations. Although, the variations may be applied to each of the images, the identifier for the image remains the same. For example, although a 3D model of a giraffe may be colored red and textured with fur, the identifier for the 3D model is still "giraffe." A human being viewing the colored and textured giraffe will be able to perceive that the 3D model is a giraffe and that the correct identifier is a giraffe; however, an automated computing system may have a difficult time determining that the 3D model is a giraffe, especially if the automated computing system is using standard giraffe characteristics to make this guess.

The access server may be configured to present the images and the identifiers along with a challenge to the client that requested access (408). The client may receive and display the images and the identifiers (410). The client may receive selected identifiers from a user for each of the images (412) and may submit the selected identifiers to the access server (414).

The access server may receive the selected identifiers from the client (416) and may compare the selected identifiers to the corrected identifiers for the images that were presented to the client (418). The access server may maintain a table in memory of the answer to the challenge that was presented to the user. For instance, the access server may maintain a table that tracks the images and/or identifiers that were served to a particular client such that when the selected identifiers are received, the selected identifiers may be compared against the identifiers in the table.

If the selected identifiers match, then the access server may grant access and redirect the client's browser to the appropriate web page in the website or to the appropriate online service, as the case may be (420). The web page(s) corresponding to the secure portion of the website may be displayed on the client browser (422).

Figure 5:
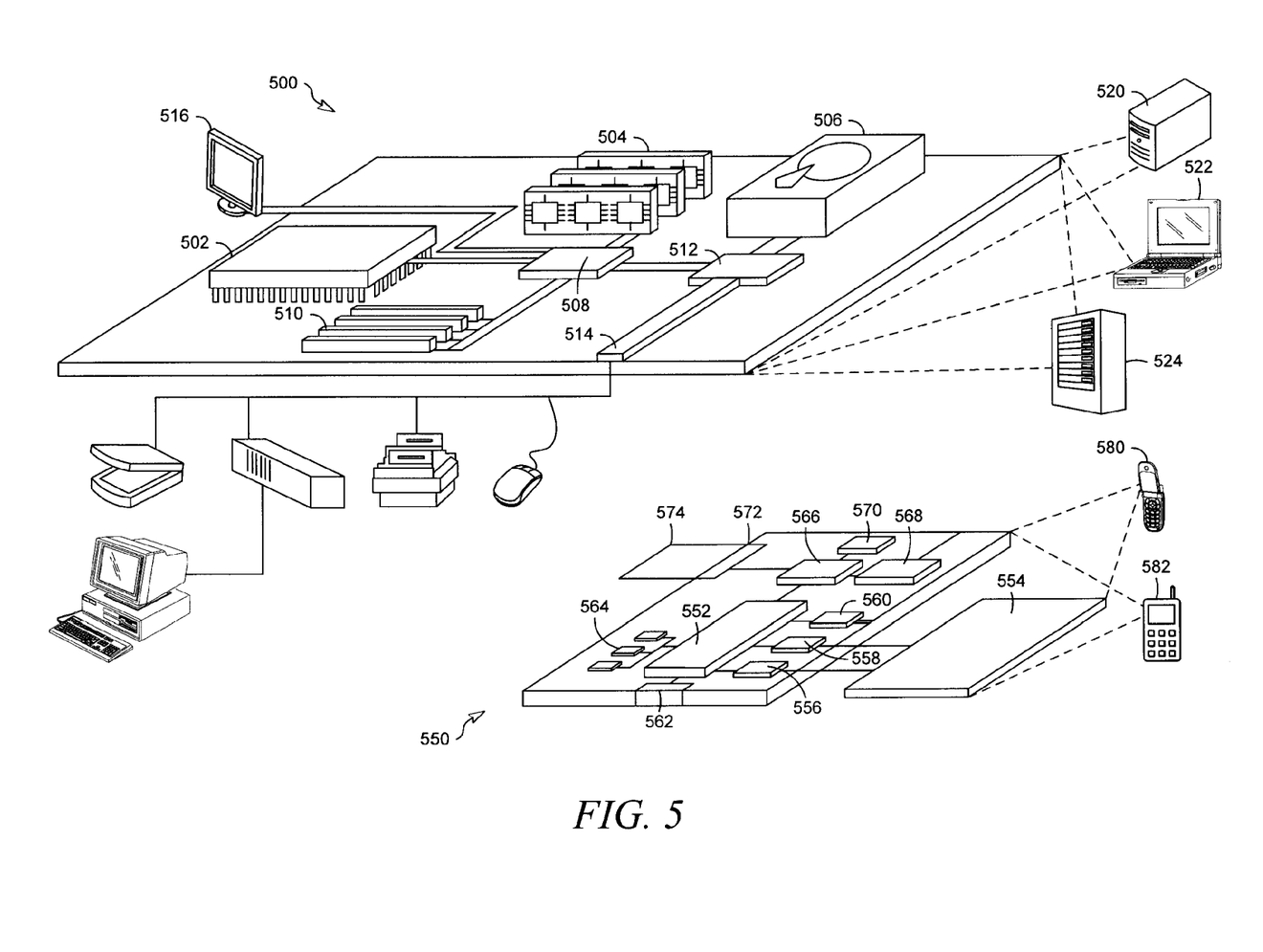
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   presenting to a user multiple images, multiple identifiers and a challenge to select one of the identifiers for each of the images, wherein:
      the images represent objects that are identifiable by a specific identifier, and
      more identifiers than images are presented in a single access attempt with the resented identifiers including the specific identifiers that identify the presented images and non-specific identifiers that do not identify the presented images;
   receiving the selected identifiers from the user from among the presented identifiers; and
   providing access to a computing service based on a comparison of the selected identifiers to an answer to the challenge when the selected identifiers match the specific identifiers to the presented images.

2. The computer-implemented method as in claim 1 wherein the images are three dimensional models.

3. The computer-implemented method as in claim 1 wherein the images are randomly textured, three dimensional models.

4. The computer-implemented method as in claim 1 wherein the images are three dimensional models with each of the three dimensional models set against a separate, randomly generated background.

5. The computer-implemented method as in claim 1 wherein the images are randomly rotated, three dimensional models.

6. The computer-implemented method as in claim 1 wherein the images are randomly colored, three dimensional models.

7. The computer-implemented method as in claim 1 wherein the images are randomly textured, three dimensional models with each of the three dimensional models set against a separate, randomly generated background.

8. The computer-implemented method as in claim 1 wherein at least two times more of the identifiers are presented than the images.

9. The computer-implemented method as in claim 1 wherein at least three times more of the identifiers are presented than the images.

10. The computer-implemented method as in claim 1 wherein providing access to the computing service comprises unlocking a mobile computing device.

11. The computer-implemented method as in claim 1 wherein providing access to the computing service comprises serving to the user a web page.

12. A computer-readable storage device having recorded and stored thereon instructions that, when executed, perform the actions of:
   presenting to a user multiple images, multiple identifiers and a challenge to select one of the identifiers for each of the images, wherein:
      the images represent objects that are identifiable by a specific identifier, and
      more identifiers than images are presented in a single access attempt with the presented identifiers including the specific identifiers that identify the presented images and non-specific identifiers that do not identify the presented images;
   receiving the selected identifiers from the user from among the presented identifiers; and
   providing access to a computing service based on a comparison of the selected identifiers to an answer to the challenge when the selected identifiers match the specific identifiers to the presented images.

13. The computer-readable storage device of claim 12 wherein the images are three dimensional models.

14. The computer-readable storage device of claim 12 wherein the images are randomly textured, three dimensional models.

15. The computer-readable storage device of claim 12 wherein the images are three dimensional models with each of the three dimensional models set against a separate, randomly generated background.

16. The computer-readable storage device of claim 12 wherein the images are randomly rotated, three dimensional models.

17. The computer-readable storage device of claim 12 wherein the images are randomly colored, three dimensional models.

18. The computer-readable storage device of claim 12 wherein the images are randomly textured, three dimensional models with each of the three dimensional models set against a separate, randomly generated background.

19. The computer-readable storage device of claim 12 wherein providing access to the computing service comprises unlocking a mobile computing device.

20. The computer-readable storage device of claim 12 wherein providing access to the computing service comprises serving to the user a web page.

21. A computer-implemented access control system, comprising: one or more servers that are arranged and configured to:
   present to a user multiple images, multiple identifiers and a challenge to select one of the identifiers for each of the images, wherein:
      the images represent objects that are identifiable by a specific identifier, and
      more identifiers than images are presented in a single access attempt with the presented identifiers including the specific identifiers that identify the presented images and non-specific identifiers that do not identify the presented images;
   receive the selected identifiers from the user from among the presented identifiers; and
   provide access to a computing service based on a comparison of the selected identifiers to an answer to the challenge when the selected identifiers match the specific identifiers to the presented images.

22. The system of claim 21 wherein the images are randomly textured, three dimensional models with each of the three dimensional models set against a separate, randomly generated background.

23. The system of claim 21 wherein the servers are arranged and configured to provide access to the computing service by serving to the user a web page.

24. A computer-implemented method, comprising:
   presenting to a user multiple images, multiple identifiers and a challenge to select one of the identifiers for each of the images, wherein:
      the images represent objects that are identifiable by a specific identifier, and
      more identifiers than images are presented in a single access attempt with the presented identifiers including the specific identifiers that identify the presented images and non-specific identifiers that do not identify the presented images;
   receiving the selected identifiers from the user from among the presented identifiers; and
   providing access to an electronic device based on a comparison of the selected identifiers to an answer to the challenge when the selected identifiers match the specific identifiers to the presented images.

25. The computer-implemented method as in claim 24 wherein the images are randomly textured, three dimensional models with each of the three dimensional models set against a separate, randomly generated background.

26. The computer-implemented method as in claim 24 wherein providing access to the electronic device comprises unlocking a music device.

27. The computer-implemented method as in claim 24 wherein providing access to the electronic device comprises unlocking a game device.

* * * * *

UNITED STATES PATENT AND TRADEMARK OFFICE
CERTIFICATE OF CORRECTION

| | | |
|---|---|---|
| PATENT NO. | : 8,196,198 B1 | Page 1 of 1 |
| APPLICATION NO. | : 12/345265 | |
| DATED | : June 5, 2012 | |
| INVENTOR(S) | : David Thomas Eger | |

It is certified that error appears in the above-identified patent and that said Letters Patent is hereby corrected as shown below:

In column 14, line 10, in claim 1, delete "resented" and insert -- presented --, therefor.

Signed and Sealed this
Eleventh Day of December, 2012

David J. Kappos
*Director of the United States Patent and Trademark Office*